April 22, 1952     R. R. BECKHAM     2,593,525
GLARE-REDUCING WINDSHIELD

Filed Aug. 5, 1950     2 SHEETS—SHEET 1

Inventor
Robert R. Beckham
By Nobbe & Swope
Attorneys

April 22, 1952  R. R. BECKHAM  2,593,525
GLARE-REDUCING WINDSHIELD
Filed Aug. 5, 1950  2 SHEETS—SHEET 2

Inventor
Robert R. Beckham
By Nobbe & Swope
Attorneys

Patented Apr. 22, 1952

2,593,525

UNITED STATES PATENT OFFICE 2,593,525

GLARE-REDUCING WINDSHIELD

Robert R. Beckham, Toledo, Ohio, assignor to Libbey-Owens-Ford Glass Company, Toledo, Ohio, a corporation of Ohio Application August 5, 1950, Serial No. 177,949

1 Claim. (Cl. 296—84)

The present invention relates generally to the reduction of sun and sky glare, and more particularly to a novel curved and angled, laminated glass windshield, or the like, that is provided with a built-in glare screen having a fade-off line, or a line of uniform density, that is substantially parallel with the horizon when the windshield is mounted in its functional position in a vehicle.

This application is a continuation-in-part of my copending application Serial No. 107,730, filed July 30, 1949; and the windshield with which this invention is primarily concerned is a specially curved and angled structure, including a nonbrittle plastic interlayer, having a colored or neutral shaded glare-reducing area which is preferably of a shade graduated from relatively deep at the top to practical extinction at the bottom, laminated together with one or more sheets of glass.

In producing the colored or neutral shaded, glare-reducing portions, or bands, in the plastic interlayer, it is desired that these portions have a cut-off or, better expressed, a fade-off line, between the colored or shaded area and the clear portion of the windshield, that is so formed that when the windshield is mounted in its functional position in an automobile this fade-off line will appear to be substantially straight and horizontal.

This is extremely important for the proper optical effect on the eyes of the driver or other occupant of the car, as they travel from side to side of the windshield; for appearance of the automobile; and to insure conformance to motor vehicle codes which require a specified amount of visibility throughout the critical viewing area of the windshield.

Now the provision of a horizontal fade-off line between the shaded and unshaded areas of a plastic interlayer that is to be mounted between the glass sheets of a flat windshield, presents little or no difficulty.

For example, for this purpose the plastic needs simply to be colored in a manner to give a straight fade-off line in the flat.

However, this relatively simple and straightforward method cannot be employed to give a properly oriented fade-off line for the shaded area of bent and angled windshields, and particularly for one-piece bent windshields which have their principal bent curvature in the horizontal plane (that is, along their longitudinal axes), which have an outline that is curved at the top and bottom, and which are mounted in the automobile at an angle to the vertical.

Such horizontally bent, and vertically angled windshields present an entirely different and unique problem.

Thus, surprisingly enough, it is impossible to provide a straight, horizontal fade-off line in a horizontally bent and vertically angled windshield if the shaded portion of the plastic interlayer was straight in the flat.

In fact, I have discovered that the only way to arrive at a substantially straight and horizontal fade-off line for the glare-reducing area of the interlayer of a horizontally bent, laminated windshield which, when mounted in its functional position in the automobile, is at an angle to the vertical, is by utilizing a shaded interlayer having a fade-off line that is curved in the flat to an extent, and in a direction, sufficient to compensate for the effect of the horizontal bend and the vertical angularity of the windshield on the apparent path or direction of the fade-off line.

It is therefore a primary aim of this invention to provide a glare-screening interlayer, for windshields of the above general shape and angularity, which has a colored or shaded area whose fade-off line is of such curvature in the flat that it will appear to the observer to follow a substantially straight and horizontal path when the bent windshield is mounted in its functional position in an automobile.

This may be accomplished in a number of specifically different ways depending on whether the glare-reducing portion of the interlayer is to be dyed, printed or otherwise applied to the plastic, the important point being that, when the colored or shaded interlayer is incorporated into a windshield by laminating with two sheets of glass that are bent in a horizontal plane, and the composite structure then mounted at an angle to the vertical in an automobile, the bottom or cut-off line of the colored area of the plastic will appear as a straight, horizontal line to the driver and occupants of the car.

Another object is the provision, in an automobile, of a horizontally bent and vertically angled windshield having a built-in glare screen with a cut-off line that is substantially parallel to the horizon.

Further objects and advantages of the invention will become more apparent during the course of the following description, when taken in connection with the accompanying drawings.

In the drawings, wherein like numerals are employed to designate like parts throughout the same:

Figure 6:
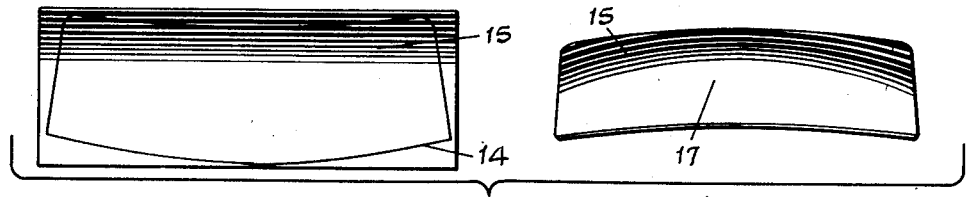
Fig. 6 is an elevation of a sheet of plastic which has been colored to produce a glare-reducing portion therein, and showing an interlayer for a bent laminated windshield cut from the plastic sheet and having a straight cut-off line in the flat.
Figure 7:
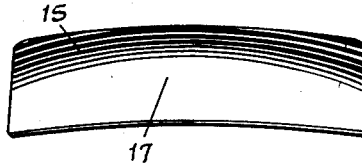
Fig. 7 is a front view of a horizontally bent, laminated windshield, into which the interlayer of Fig. 6 has been incorporated, showing the appearance of the fade-off line when the windshield is mounted in its functional position in an automobile.
Figure 8:
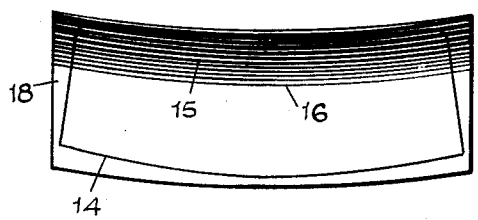
Figure 9:
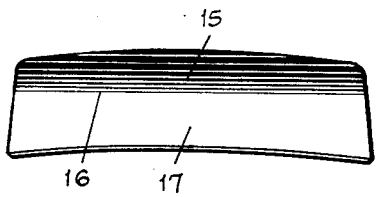

Fig. 8 is a view similar to Fig. 6 but showing a sheet of colored plastic after it has been distorted according to this invention, and showing how an interlayer is cut therefrom to give a curved cut-off line in the flat; and Fig. 9 is a view similar to Fig. 7 but showing how the interlayer of Fig. 8 will look when incorporated into a horizontally bent, laminated windshield and the windshield mounted in its functional position in an automobile.

Figure 1:
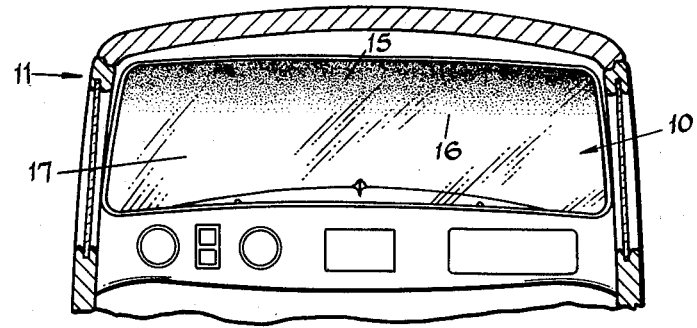
Fig. 1 is an elevation of the windshield of the invention as viewed from the interior of an automobile in which it is installed.
Figure 2:
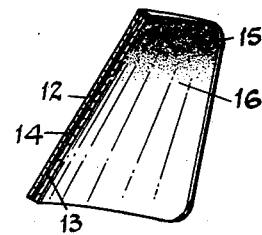
Fig. 2 is a vertical sectional view through the windshield arranged in the angled position which it occupies in the automobile.
Figure 5:
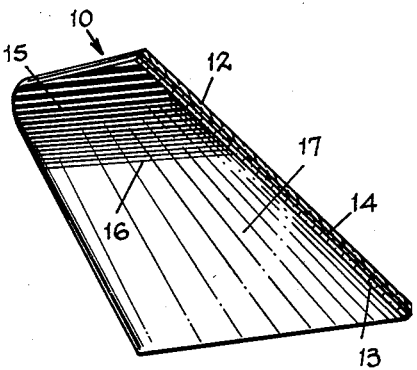
Fig. 5 is a vertical section through the windshield of Fig. 4, taken substantially along the line 5—5 and showing the angle at which the windshield will be mounted when in its functional position in the automobile.

Referring now more particularly to the drawings, there is illustrated in Fig. 1 a windshield 10, produced in accordance with this invention, as it appears from the front seat of an automobile 11 in which the windshield is mounted. As explained above, this windshield is of conventional laminated construction in that it comprises two sheets of glass 12 and 13 and a non-brittle plastic interlayer 14 (Figs. 2 and 5). However, it departs from the ordinary construction by being specially shaped, and by having its plastic interlayer 14 provided with a glare-reducing area or band 15 which is colored or of a neutral shade and graduated in intensity from relatively dark at the top to practical extinction at the bottom, ending in an almost impercepticle cut-off line 16 between the colored or shaded and uncolored or unshaded areas.

The purpose of this is to provide, within the windshield, a glare-reducing area in which the color or neutral shade is relatively deep or intense at the top of the windshield, which is the area presenting the greatest glare, and tapers off gradually to a very low intensity, or to no shade or color at all, as it approaches the essential sighting area 17 of the windshield.

It will be noted from Fig. 1 that to the eye of an observer in the car the cut-off line 16 of the colored or neutral shaded area 15 appears as a straight, horizontal line. However, this is not actually the case, and I have discovered that in the specially curved, shaped and angled windshields now coming into common use in the modern streamlined and revolutionary designs of automobiles proposed for, and currently on, the market, a cut-off line in the colored area of the plastic interlayer that is actually straight and horizontally arranged will not appear to be so when laminated with the glass sheets and mounted in the automobile.

Figure 4:
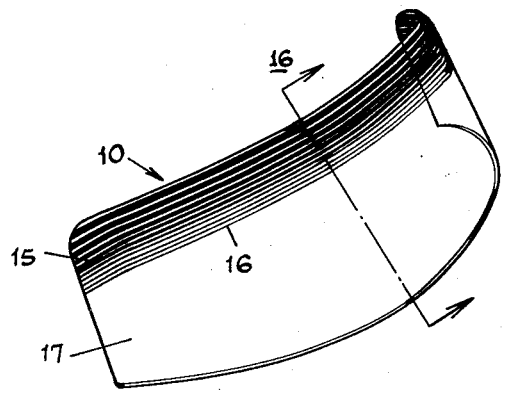
Fig. 4 is a perspective view of a laminated safety glass windshield, having its principal bent curvature in the horizontal plane, or along its longitudinal axis, and provided with a glare-reducing portion in its plastic interlayer.

To illustrate, the windshield shown in Fig. 4 is of characteristically modern shape in that it has its principal curvature in the horizontal plane. Now this particular windshield is intended to be mounted in its functional position in an automobile at an angle to the vertical as shown in Fig. 5; and in this position, the cut-off line 16 of the glare-reducing portion 15 should appear as a substantially straight, horizontal line.

However, as illustrated in Figs. 6 and 7, when an interlayer for such a windshield is produced in the prior known manner by first forming a straight band of colored or neutral shade across one margin of a plastic sheet (Fig. 6), and then cutting an interlayer 14 to the windshield outline and with a glare reducing portion 15 having a straight cut-off line 16 from the shaded plastic, it will be found that when this interlayer is sandwiched between two pieces of bent glass and mounted in the automobile that the cut-off line will no longer appear to be either straight or horizontal.

Instead, it will appear in the horizontally bent and vertically angled windshield as shown in Fig. 7, that is, as a curved line which runs down rather sharply at the two opposite ends. This is of course an unsatisfactory condition, not only because of its undesirable appearance, but because the end curves run into the essential or critical viewing area 17 of the windshield.

Consequently, an interlayer having a shaded portion which actually has a straight cut-off or fade-out line cannot be used to obtain the desired result in windshields of this form. Instead, I have found that it is necessary to produce a glare-reducing area with a cut-off line which, regardless of its form when the plastic sheet is in the flat, is so designed that it will appear as a substantially straight, horizontal line when the shaded plastic has been laminated into the bent windshield and the windshield mounted at an angle in the automobile.

Figure 3:
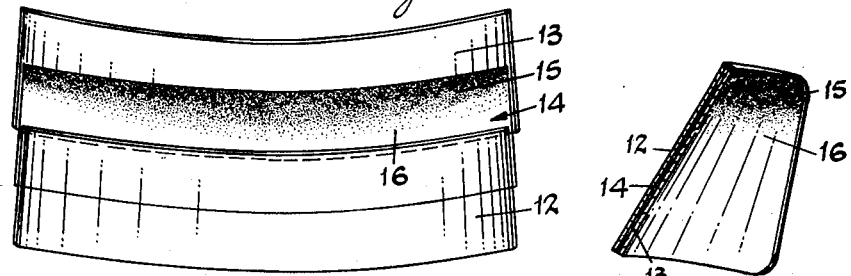
Fig. 3 is a perspective plan view of two sheets of glass and a colored or shaded plastic interlayer prior to assembly into a sandwich and laminating into a finished windshield.

Thus, in the windshield 10 of Figs. 1 to 3, and which is characteristic in shape, contour and angled position to the newer modern designs, it will be seen that, in order to obtain the straight horizontal effect of cut-off line seen in Fig. 1, it has been necessary to provide a colored area 15 having a cut-off line that is actually not straight at all, and so cannot be horizontally arranged. Instead, as best seen in Fig. 3, the cut-off line 16 is actually curved and is somewhat similar in contour to the curvature of the top lines of the glass sheets 12 and 13.

Now the coloring of a plastic sheet in a manner to produce a glare-reducing portion of this shape that is properly graduated in color or shade from top to bottom, and which has an almost imperceptible cut-off line, presents a considerable problem.

Nevertheless, it can be done in a number of ways and I have discovered one novel and yet relatively simple way of accomplishing it, which has been set forth in detail in my co-pending application Serial No. 107,730, which has already been referred to, and of which this application is a continuation-in-part.

However, regardless of how the plastic sheet 18 is colored, it is customarily trimmed as shown in Fig. 8 to form an interlayer 14 of the windshield outline and to remove the marginal portions or selvage of the sheet. The interlayer 14 is then assembled together with two pieces of glass as shown in Fig. 5 to form a glass-plastic sandwich which is then laminated under heat and pressure to form a composite, unitary structure. When this laminated glass structure is mounted as a windshield in an automobile at the angle shown in Fig. 5, it will exhibit a colored glare-reducing area 15 having a horizontal cut-off line 16, as shown in Fig. 9.

It will be appreciated that the glare-reducing portion of the windshield of this invention can be produced by printing, or in other suitable ways, as well as by dyeing; that the invention is also applicable to plastic interlayers in which the glare-reducing portions are shaded bands of unvarying density; and to plastic interlayers which are shaded or colored over their entire areas, with the shade varying from full density at one edge to very light density at another.

In the latter case there would, of course, be no cut-off or fade-off line other than the edge of the interlayer, but the advantage of the invention in that case would be to give imperceptible, horizontal lines of uniform density across the shaded area, so that, as the eye of an observer travels from side to side of the windshield along any horizontal path it will be looking through the same density of shading at all points.

In fact, it is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claim.

I claim:

In an automobile having a body provided with a windshield opening, a windshield mounted in functional position in said opening and comprising two sheets of glass and an interposed layer of plastic material bonded to one another to provide a unitary structure, said windshield being bent along the longitudinal axis thereof with its opposite end portions curving rearwardly toward said body and being positioned at an angle to the vertical with the upper edge disposed inwardly of the lower edge thereof when mounted in said functional position, and a shaded area on said plastic interlayer comprising a colored band extending from one side to the other of the windshield along the upper marginal edge portion thereof and decreasing in intensity from the top of the interlayer toward the bottom thereof to an imperceptible substantially horizontal fade-off line along the bottom of said shaded area and with said colored band exhibiting uniform density from one side to the other along any horizontal line between the fade-off line and the upper edge of the windshield when the windshield is in said functional position and viewed from the interior of the automobile.

ROBERT R. BECKHAM.

REFERENCES CITED

The following references are of record in the file of this patent:

UNITED STATES PATENTS

| Number | Name | Date |
|---|---|---|
| 2,315,103 | Anderson | Mar. 30, 1943 |

FOREIGN PATENTS

| Number | Country | Date |
|---|---|---|
| 370,656 | Great Britain | Apr. 14, 1932 |